(12) United States Patent
Nagasawa (10) Patent No.: US 12,534,137 B2
(45) Date of Patent: Jan. 27, 2026

(54) VEHICLE BODY FRONT STRUCTURE

(71) Applicant: SUBARU CORPORATION, Tokyo (JP)

(72) Inventor: Isamu Nagasawa, Tokyo (JP)

(73) Assignee: Subaru Corporation, Tokyo (JP)

( * ) Notice: Subject to any disclaimer, the term of this patent is extended or adjusted under 35 U.S.C. 154(b) by 435 days.

(21) Appl. No.: 18/203,751

(22) Filed: May 31, 2023

(65) Prior Publication Data
US 2023/0415817 A1    Dec. 28, 2023

(30) Foreign Application Priority Data

Jun. 23, 2022    (JP) .................... 2022-101440

(51) Int. Cl.
*B62D 21/15*    (2006.01)
*B62D 21/02*    (2006.01)
*B62D 25/08*    (2006.01)

(52) U.S. Cl.
CPC ........... *B62D 21/152* (2013.01); *B62D 21/02* (2013.01); *B62D 25/08* (2013.01)

(58) Field of Classification Search
None
See application file for complete search history.

(56) References Cited

U.S. PATENT DOCUMENTS

| | | | | |
|---|---|---|---|---|
| 9,216,768 B1 * | 12/2015 | Dressel | ............. | B62D 21/155 |
| 2012/0133177 A1 * | 5/2012 | Baccouche | ........ | B62D 25/082 |
| | | | | 296/187.03 |
| 2012/0242113 A1 * | 9/2012 | Yasuhara | ............ | B62D 21/11 |
| | | | | 296/193.07 |
| 2012/0248820 A1 * | 10/2012 | Yasui | ................ | B62D 21/152 |
| | | | | 296/193.09 |
| 2016/0236718 A1 * | 8/2016 | Tatsuwaki | .......... | B60R 19/34 |

FOREIGN PATENT DOCUMENTS

| | | | |
|---|---|---|---|
| EP | 1477392 A2 * | 11/2004 | ........ B62D 21/152 |
| JP | 2020-83144 A | 6/2020 | |

OTHER PUBLICATIONS

JP 7014092 B2 (Year: 2022).*

* cited by examiner

*Primary Examiner* — Lori Lyjak
(74) *Attorney, Agent, or Firm* — McGinn IP Law Group PLLC (57) ABSTRACT

A vehicle body front structure includes front side frames, sub-frames, upper frames, a cross member, columnar frames each disposed outward of a joint between a corresponding one of the front side frames and the cross member in a vehicle width direction, coupling frames each disposed on a corresponding one of the columnar frames, and reinforcement brackets each coupled to a front portion and an outer portion of a corresponding one of the coupling frames. The columnar frame each couple the corresponding one of the front side frames and a corresponding one of the sub-frames in a vehicle vertical direction. The coupling frame each couple the corresponding one of the columnar frames and a corresponding one of the upper frames in the vehicle vertical direction. The reinforcement brackets each couple the corresponding one of the coupling frames and a rear portion of a corresponding one of the upper frames.

2 Claims, 7 Drawing Sheets

VEHICLE BODY FRONT STRUCTURE

CROSS-REFERENCE TO RELATED APPLICATIONS

The present application claims priority from Japanese Patent Application No. 2022-101440 filed on Jun. 23, 2022, the entire contents of which are hereby incorporated by reference.

BACKGROUND

The disclosure relates to a vehicle body front structure.

Generally, in a frontal collision of a vehicle, in order to reduce injury to an occupant, it is effective to prevent deformation of a cabin, which is an occupant boarding space. For this purpose, various devices have been provided.

In recent years, as one of these devices, a structure forward of the cabin and configured to absorb collision energy has prevailed.

Meanwhile, when the vehicle is a hybrid vehicle, an electric vehicle or the like, a battery pack as a power source of the vehicle is mounted on a floor surface under the cabin in some cases.

Power to drive the vehicle is stored in the battery pack. When deformation or disconnection of the battery pack occurs due to a frontal collision of the vehicle, for example, there is also a possibility of inducing a drastic abnormal reaction. In this respect, there is room for improvement.

Therefore, in the case of a hybrid vehicle, an electric vehicle or the like, a degree of importance of the structure configured to prevent deformation of the cabin has been increased not to damage the battery pack.

In response to this demand, a technique is disclosed in which when an impact of a frontal collision is applied to a vehicle where a battery is mounted, such as a hybrid vehicle and an electric vehicle, deformation of front side members by the impact is controlled, for example, so that collision energy is absorbed, and that a drive motor disposed in a front part of the vehicle is protected (see, for example, Japanese Unexamined Patent Application Publication (JP-A) No. 2020-083144).

SUMMARY

An aspect of the disclosure provides a vehicle body front structure for a vehicle. The vehicle body front structure includes front side frames, sub-frames, upper frames, a cross member, columnar frames, coupling frames, reinforcement brackets. The front side frames are disposed in a front of the vehicle on both sides of the vehicle in a vehicle width direction of the vehicle. The front side frames extend in a vehicle fore-and-aft direction of the vehicle. The sub-frames are disposed below of the front side frames on the both sides in the vehicle width direction respectively. The sub-frames extend in the vehicle fore-and-aft direction. The upper frames are disposed above the front side frames on the both sides in the vehicle width direction respectively. The upper frames extend in the vehicle fore-and-aft direction. The cross member extends in the vehicle width direction in the front of the vehicle and is coupled to the front side frames. Each of the columnar frames is disposed outward of a joint between a corresponding one of the front side frames and the cross member in the vehicle width direction. The columnar frames extend in a vehicle vertical direction of the vehicle. Each of the coupling frames is disposed on a corresponding one of the columnar frames. Each of the coupling frames has a front portion in the fore-and-aft direction and an outer portion in the vehicle width direction that are coupled to the corresponding one of the columnar frames. Each of the reinforcement brackets is coupled to the front portion and the outer portion of a corresponding one of the coupling frames in the vehicle width direction. Each of the reinforcement brackets includes a rear portion in the fore-and-aft direction that is shaped so as to project upward toward a rear of the vehicle. Each of the columnar frame couples the corresponding one of the front side frames and a corresponding one of the sub-frames in the vehicle vertical direction. Each of the coupling frames couples the corresponding one of the columnar frames and a corresponding one of the upper frames in the vehicle vertical direction. Each of the reinforcement brackets couples the corresponding one of the coupling frames and a rear portion of a corresponding one of the upper frames in the fore-and-aft direction.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 4A to FIG. 4C are plan views of the vehicle body front structure according to the embodiment of the disclosure, illustrating deformation of the vehicle body front structure in the event of a full wrap frontal collision as viewed from above.

FIG. 6A to FIG. 6C are plan views of the vehicle body front structure according to the embodiment of the disclosure, illustrating deformation of the vehicle body front structure in the event of a small overlap collision as viewed from above.

DETAILED DESCRIPTION

Concerning a frontal collision of a vehicle, multiple collision modes are to be considered, for example, a full wrap frontal collision in which a whole front surface of the vehicle collides with a collision object, an offset collision in which one side of the front surface of the vehicle collides with the collision object, and a small overlap collision having an offset rate of approximately 25%.

Therefore, in each of the collision modes, there has been a demand for a structure forward of a cabin or a battery pack and configured to absorb collision energy so as not to deform the cabin and the battery pack.

In the technique disclosed in JP-A No. 2020-083144, the structure is proposed in which front side members on both sides of the vehicle are bent inward in vehicle width directions due to fragile portions formed in a cross member in such a manner that collision energy generated in the multiple collision modes is absorbed more effectively.

However, in the technique disclosed in JP-A No. 2020-083144, an impact absorption structure configured to protect the cabin or the battery pack disposed rearward of the cross member is not considered, and consequently, when the collision energy is transmitted rearward of the fragile portions of the front side members on both sides of the vehicle, there is a possibility of deforming the cabin or the battery pack. In this respect, there is room for improvement.

It is desirable to provide a vehicle body front structure that can prevent deformation of the cabin and the battery pack even in the multiple frontal collision modes.

Hereinafter, referring to FIG. 1 to FIG. 7, a description will be given on a vehicle V to which a vehicle body front structure S according to an embodiment of the disclosure is applied. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
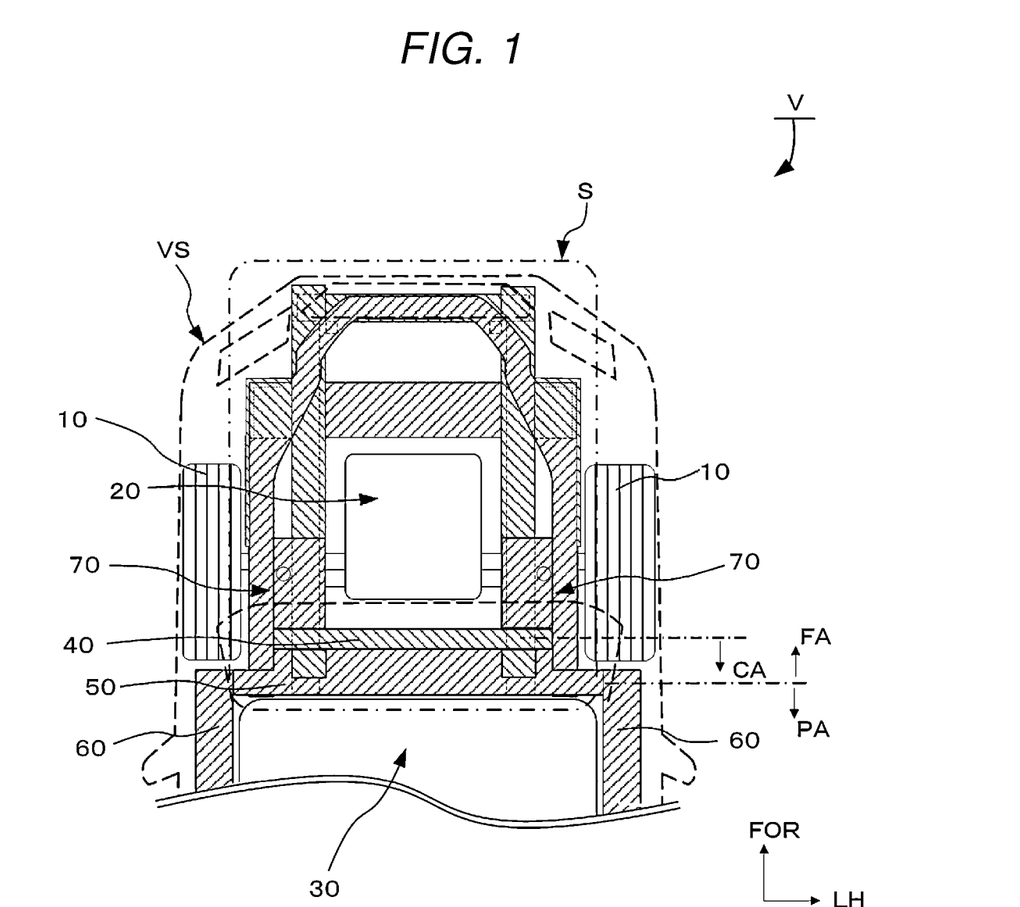
FIG. 1 is a schematic diagram illustrating a vehicle according to an embodiment of the disclosure, as viewed from above.

It is noted that as illustrated for convenience in the drawings, arrow FOR indicates forward (front) of the vehicle V illustrated in FIG. 1, arrow UP indicates upward of the vehicle V in a front view, and arrow LH indicates leftward of the vehicle V in a front view. In the following description, a vertical direction, a fore-and-aft direction, and a lateral direction are used to respectively indicate a vertical direction in a front view, a fore-and-aft direction in a front view, and a lateral direction in a front view unless specified otherwise.

Embodiment

Figure 2:
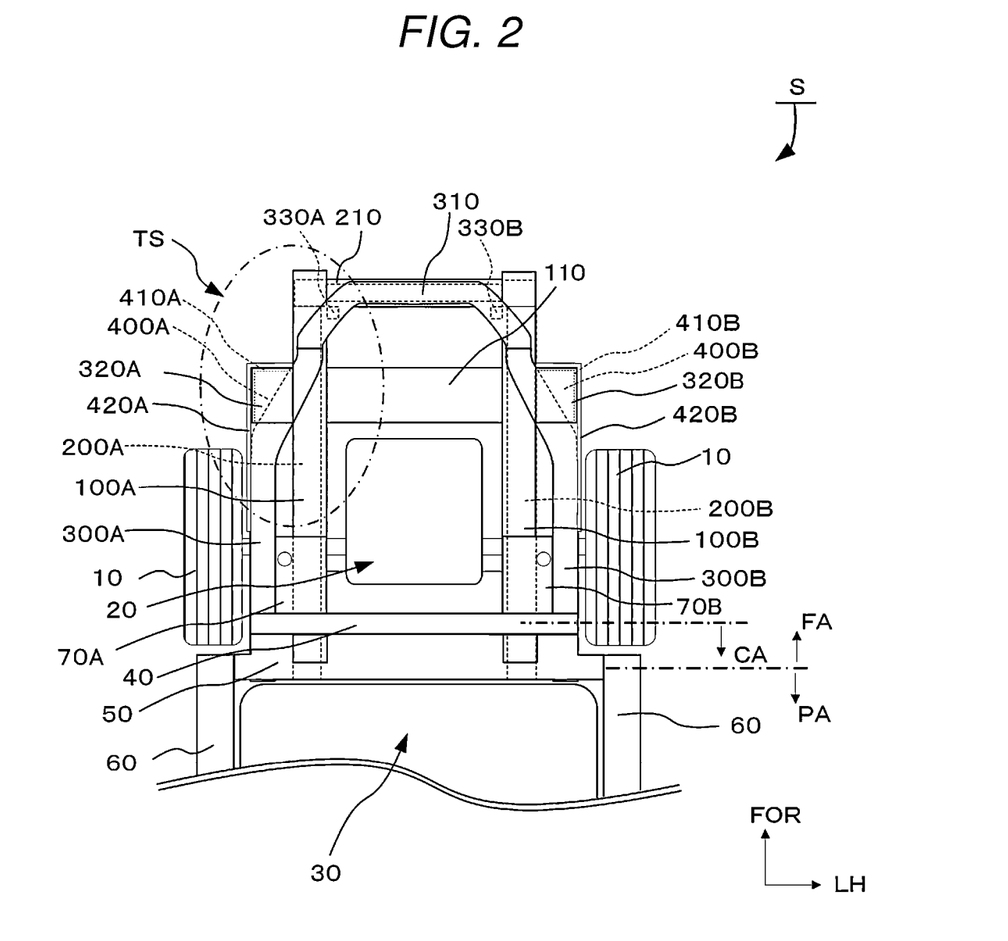
FIG. 2 is a schematic diagram illustrating a vehicle body front structure illustrated in FIG. 1, as viewed from above.
Figure 3:
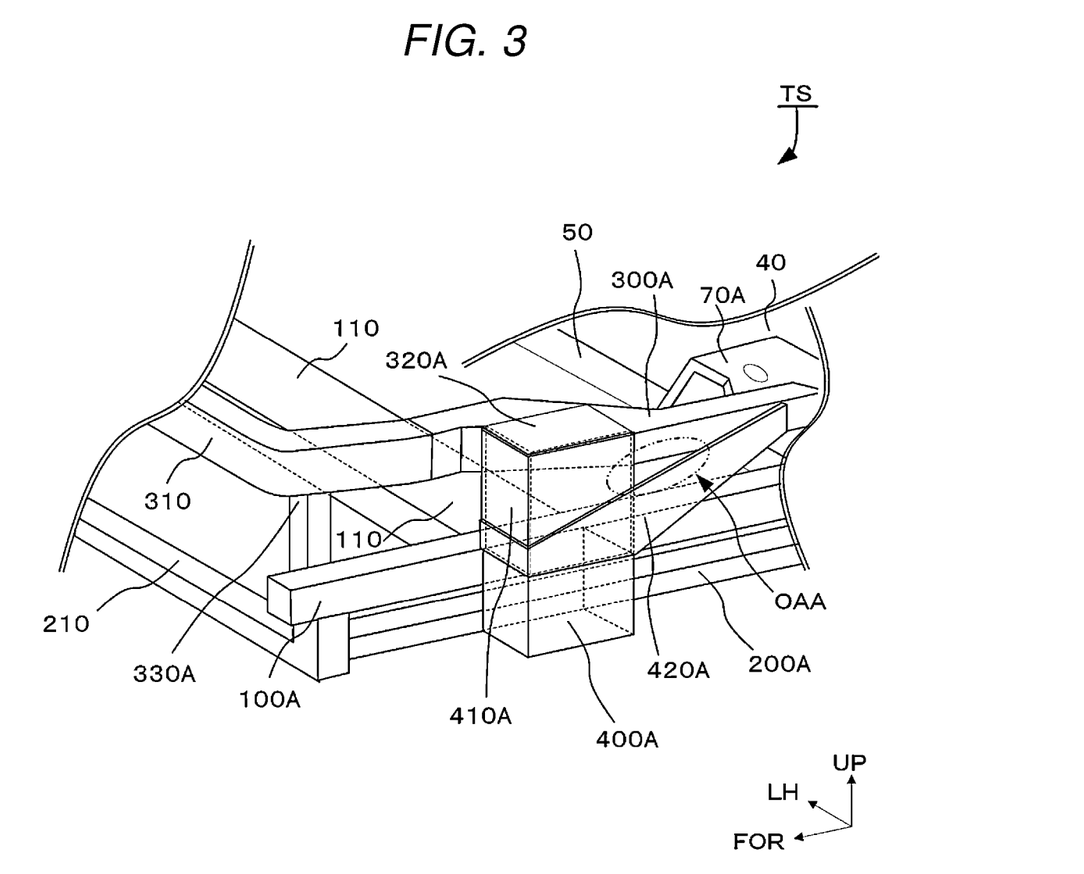
FIG. 3 is a perspective view of area TS illustrated in FIG. 2, as viewed from above.

Referring to FIG. 1 to FIG. 3, a configuration of the vehicle body front structure S according to the embodiment provided for the vehicle V will be described.
Configuration of Vehicle V The vehicle V is, for example, an electric vehicle including a power unit 20 as a drive source. However, the vehicle V may be, for example, a hybrid electric vehicle including an engine and the power unit 20 as drive sources.

As illustrated in FIG. 1, the vehicle V includes, inside a vehicle body VS, front wheels 10, the power unit 20, a battery pack 30, a toeboard 40, a torque box 50, side sills 60, and the vehicle body front structure S (diagonally shadowed portions surrounded by the single chain line in FIG. 1).

The power unit 20 is a drive device configured to drive the front wheels 10 and including components, not illustrated, such as a motor, a transmission, a clutch, and a drive shaft. The power unit 20 is disposed in a space interposed between front side frames 100 and sub-frames 200, described later. The power unit 20 is placed on and secured to upper surfaces of the front side frames 100.

The battery pack 30 has a flat box shape, for example. Inside the battery pack 30, a large number of battery cells are connected in series. The battery pack 30 is capable of outputting high voltage supplied to the power unit 20, and stores power used for vehicle travel. The battery pack 30 is disposed in a space surrounded by rigid frames, such as the torque box 50 and the side sills 60, described later. The battery pack 30 is used in a vehicle, such as an electric vehicle (EV) and a hybrid electric vehicle (HEV).

The toeboard 40 is a partition wall standing in the vertical direction in front of a cabin CA so as to separate the front wheel drive device and the cabin CA of the vehicle V from each other. The toeboard 40 is coupled to vehicle rear portions of the front side frames 100, described later, by welding, for example.

The torque box 50 is a component interposed between the front side frames 100 and the side sills 60, described later, and configured to couple the front side frames 100 and the side sills 60 to each other. The torque box 50 is a framework extending on a bottom surface of the vehicle V in a vehicle width direction, and is coupled to one end portion of each of the front side frames 100 on both sides of the torque box 50 in the vehicle width direction by welding, for example. The torque box 50 is made of a material such as a metal of high rigidity, and has a substantially rectangular closed cross-sectional shape. The torque box 50 is located forward of the battery pack and each end portion of the torque box 50 is coupled to one end portion of each of the side sills 60 on both sides of the torque box 50 in the vehicle width direction by welding, for example.

The one end portion of each of the front side frames 100 on both sides of the torque box 50 in the vehicle width direction is coupled to a front surface and an upper surface of the torque box 50 by welding, for example.

It is noted that an area on a vehicle rear side of the torque box 50 is a protection area PA configured to prevent deformation of the cabin CA located above the protection area PA and the battery pack 30 located below the protection area PA.

The side sills 60 are disposed on the bottom surface of the vehicle V on both sides in the vehicle width direction. Each of the side sills 60 is a framework extending in the fore-and-aft direction, is made of a material such as a metal of high rigidity, and has a substantially rectangular closed cross-sectional shape. The side sills 60 constitute bottom sides of the protection area PA on both sides.

Strut towers 70 (strut towers 70A, 70B) are vehicle body-side supports on which a suspension is attached. The strut towers 70 are disposed at a vehicle front side of the toeboard 40 and on both sides in the vehicle width direction. Each of the strut towers 70 is a framework inclined from an upper portion on an outer side of the vehicle V in the vehicle width direction toward a lower portion on an inner side of the vehicle V in the vehicle width direction. The strut towers 70 are made of a material such as a metal of high rigidity, and have a substantially rectangular closed cross-sectional shape. The upper portion of each of the strut towers 70 on the outer side of the vehicle V in the vehicle width direction is coupled to the upper frame 300, described later.

The vehicle body front structure S is disposed inside a vehicle front compartment FA forward of the torque box 50. A configuration of the vehicle body front structure S will be described below.
Configuration of Vehicle Body Front Structure S Referring to FIG. 2 and FIG. 3, the vehicle body front structure S according to the embodiment will be described.

As illustrated in FIG. 2, the vehicle body front structure S according to the embodiment includes: the front side frames 100 (front side frames 100A, 100B); a cross member 110; the sub-frames 200 (sub-frames 200A, 200B); a sub-cross member 210; the upper frames 300 (upper frames 300A, 300B); a bumper beam 310; columnar frames 400 (columnar frames 400A, 400B); coupling frames 410 (coupling frames 410A, 410B); and reinforcement brackets 420 (reinforcement brackets 420A, 420B). The vehicle body front structure S is in lateral symmetry in the vehicle width directions.

Front Side Frames 100

The front side frames 100 are provided in a pair in the vehicle width direction in a front part of the vehicle V. The front side frames 100 are located at sides of the power unit 20 configured to drive the front wheels 10 of the vehicle V, and extend in the vehicle fore-and-aft direction. The front side frames 100 constitute a framework of the vehicle V, and are made of a material such as a metal of high rigidity. Each of the front side frames 100 has a substantially rectangular closed cross-sectional shape. Lower surfaces of vehicle front portions of the front side frames 100 are coupled to the sub-cross member 210, described later, by welding, for example. End portions of the front side frames 100 on the vehicle rear side are coupled to the torque box 50 by welding, for example.

Cross Member 110

The cross member 110 extends in the vehicle width direction on end portions of the front side frames 100 at the vehicle front side. Both ends of the cross member 110 are coupled to the front side frames 100 on both sides in the vehicle width direction by welding, for example. The cross member 110 is made of a material such as a metal, and has a substantially rectangular closed cross-sectional shape.

Sub-Frames 200

As illustrated in FIG. 3, the sub-frames 200 extend in the vehicle fore-and-aft direction at a vehicle lower side of the front side frames 100. The sub-frames 200 are provided in a pair on both sides in the vehicle width direction. The sub-frames 200 are disposed on both sides of the vehicle front in the vehicle width direction, and are made of a material such as a metal of high rigidity. Each of the sub-frames 200 has a substantially rectangular closed cross-sectional shape. End portions of the sub-frames 200 on the vehicle rear side are coupled to the torque box 50 by welding, for example.

Sub-Cross Member 210

The sub-cross member 210 extends in the vehicle width direction on end portions of the sub-frames 200 at the vehicle front side. The sub-cross member 210 is made of a material such as a metal, and has a substantially rectangular closed cross-sectional shape. Outer end portions of the sub-cross member 210 in the vehicle width directions are bent at a substantially right angle toward a vehicle upper side. A side surface of each of the bent portions of the sub-cross member 210 at the vehicle rear side is coupled to a vehicle front end portion of the sub-frame 200 on each side in the vehicle width direction by welding, for example. A vehicle upper end of each of the bent portions of the sub-cross member 210 is coupled to the front side frame 100 by welding, for example.

Upper Frames 300

As illustrated in FIG. 2, the upper frames 300 extend in the vehicle fore-and-aft direction on both sides in the vehicle width direction and are disposed at a vehicle upper side of the front side frames 100. The upper frames 300 are made of a material such as a metal, and have a substantially rectangular closed cross-sectional shape. The upper frames 300 are coupled to the toeboard 40 and the strut towers 70 at the vehicle rear side. Vehicle front end portions of the upper frames 300 are coupled to the bumper beam 310, described later. A cover 320 (covers 320A, 320B) of a substantially rectangular plate shape is formed as a component integral to an upper surface of a vehicle front portion of each of the upper frames 300 on an outer side in the vehicle width direction.

Bumper Beam 310

The bumper beam 310 extends in the vehicle width direction in a front end portion of the vehicle V and constitutes a framework in the vehicle front end portion. The bumper beam 310 is made of a material such as a metal, and has a substantially rectangular closed cross-sectional shape. The bumper beam 310 is coupled to vehicle front end portions of the upper frames 300 on both sides in the vehicle width direction by welding, for example. As illustrated in FIG. 3, a support post 330 (support posts 330A, 330B) is coupled to an inner surface of each of outer end portions of the bumper beam 310 at the vehicle front side. The support post 330 extends to the vehicle lower side. The vehicle lower side of the support post 330 is coupled to an inner surface of each of the front side frames 100 in the vehicle width direction.

In the vehicle body front structure S, a rigid framework of a number-sign shape of double crosses intersecting each other in parallel is formed by coupling the front side frames 100 on both sides in the vehicle width direction, the cross member 110, the sub-frames 200, the sub-cross member 210, the upper frames 300, the bumper beam 310, the torque box 50, the side sills 60, and the strut towers 70 to one another.

Columnar Frames 400

As illustrated in FIG. 3, each of the columnar frames 400 is a column extending in the vehicle vertical direction on an outer side of a joint between the front side frame 100 and the cross member 110 in the vehicle width direction. The columnar frame 400 couples the front side frame 100 and the sub-frame 200 to each other in the vehicle vertical direction. In one example, an inner surface of a vehicle upper portion of the columnar frame 400 in the vehicle width direction is coupled to an outer surface of the front side frame 100 in the vehicle width direction by welding, for example, whereas an inner surface of a vehicle lower portion of the columnar frame 400 in the vehicle width direction is coupled to an outer surface of the sub-frame 200 in the vehicle width direction by welding, for example. The columnar frames 400 are disposed at such positions that even when a small overlap collision occurs from the front, the columnar frames 400 can sustain the collision. In one example, the center of a vehicle front surface of each of the columnar frames 400 is located at a distance 25% or less of an inside of the vehicle V in the vehicle width direction from a vehicle width end of the vehicle V.

Coupling Frames 410

Each of the coupling frames 410 is placed on a vehicle upper side of the columnar frame 400, and a lower edge of a vehicle front portion and a lower edge of an outer portion of the coupling frame 410 in the vehicle width direction are coupled to the columnar frame 400. The coupling frame 410 is a plate-shaped member of a substantially L shape facing forward of the vehicle V and outward in the vehicle width direction. The coupling frame 410 couples the columnar frame 400 and the upper frame 300 to each other in the vehicle vertical direction. In one example, the cover 320 coupled to the upper surface of the upper frame 300 is coupled to the vehicle upper side of the coupling frame 410 so as to cover the vehicle upper side of the coupling frame 410. Moreover, the coupling frame 410 is coupled to a front surface of a vehicle upper portion and an outer surface of an upper portion of the columnar frame 400 in the vehicle width direction in such a manner that the coupling frame 410 and the columnar frame 400 form identical planes.

Reinforcement Brackets 420

Each of the reinforcement brackets 420 is a plate-shaped member of a substantially L shape facing forward of the vehicle V and outward in the vehicle width direction. A vehicle rear portion of the reinforcement bracket 420 projects upward toward the vehicle rear. The reinforcement bracket 420 couples the coupling frame 410 and a vehicle rear side of the upper frame 300 to each other. In one example, the reinforcement bracket 420 is coupled to the vehicle front side and the outer side of the coupling frame 410 in the vehicle width direction by welding, for example. The reinforcement bracket 420 projects toward a joint between the strut tower 70 and the upper frame 300, and is coupled to an outer surface of a vehicle rear portion of the upper frame 300.

An opening OA (openings OAA, OAB) is formed in a vehicle upper side of the reinforcement bracket 420 and surrounded by a vehicle rear edge of the coupling frame 410, a lower edge of a vehicle rear portion of the upper frame 300, and a vehicle upper edge of the reinforcement bracket 420. The opening OA is substantially triangular shape in a side view, and provided as a fragile portion.

Operation and Effect

In the case of a full wrap frontal collision, a collision object collides with the vehicle body front structure S of the above-described configuration according to the embodiment on both sides of the vehicle front, and in the case of an overlap collision and a small overlap collision, the collision object collides with the vehicle body front structure S on one side of the vehicle front in the vehicle width direction. Hereinafter, referring to FIG. 4A to FIG. 4C and FIG. 5, an operation in the case of occurrence of a full wrap frontal collision will be described.

Case of Full Wrap Frontal Collision

Figure 4A:
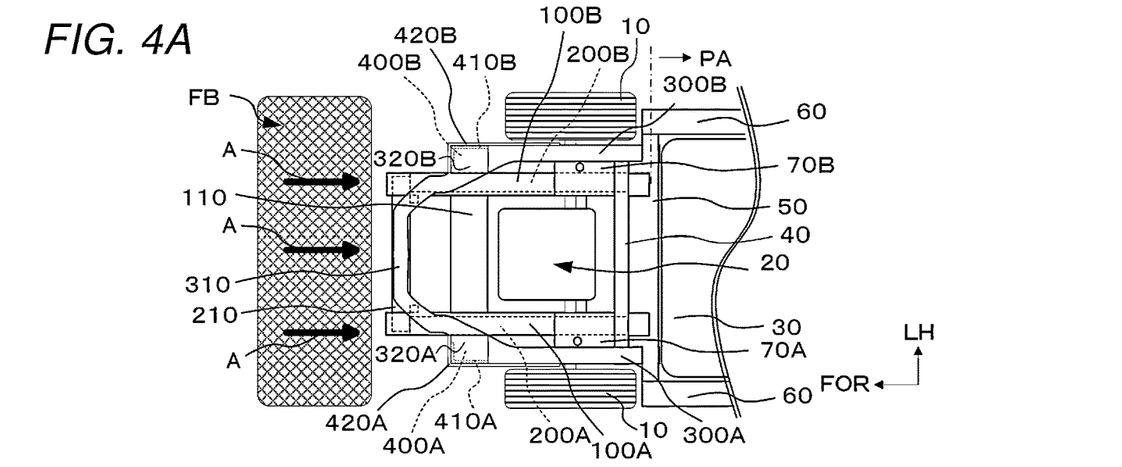
FIG. 4A is a plan view prior to the collision.

When a full wrap frontal collision of a collision object FB with the vehicle V occurs, as illustrated in FIG. 4A, collision energy is generated toward the vehicle V from a direction indicated by arrows A.

Figure 4B:
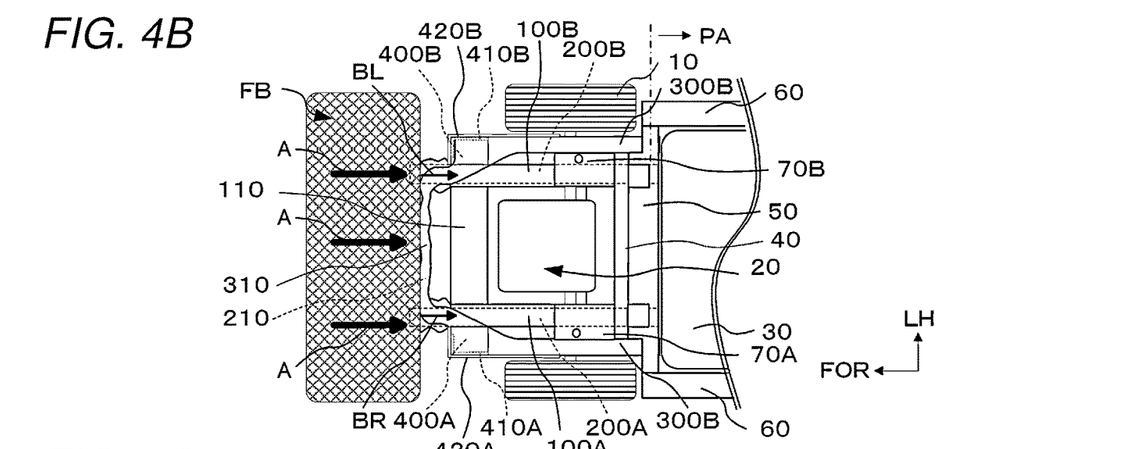
FIG. 4B and FIG. 4C are plan views illustrating the deformation during the frontal collision as time elapses.

As illustrated in FIG. 4B, the collision energy from the front surface of the vehicle V as indicated by arrows A is transmitted to the upper frames 300 via the front side frames 100, the sub-frames 200, and the bumper beam 310.

The collision energy is transmitted to the front side frames 100 in a direction indicated by arrows B (arrows BL, BR) rearward from the vehicle front side. Then, the collision energy collapses the vehicle front end portions of the front side frames 100, so that the collision energy is absorbed by deformation of the front side frames 100.

The collision energy is transmitted to the sub-frames 200 in the direction indicated by arrows B. Because the sub-cross member 210 is disposed at the vehicle front side of the sub-frames 200, the collision energy transmitted from the direction indicated by arrows B collapses the sub-frames 200 while pressing and deforming the sub-cross member 210 toward the vehicle rear. Then, the collision energy collapses the vehicle front end portions of the sub-frames 200, so that the collision energy is absorbed by deformation of the sub-frames 200.

The collision energy is transmitted to the upper frames 300 in the direction indicated by arrows B. Because the bumper beam 310 is disposed at the vehicle front side of the upper frames 300, the collision energy transmitted from the direction indicated by arrows B collapses the upper frames 300 while pressing and deforming the bumper beam 310 toward the vehicle rear. Then, the collision energy collapses the vehicle front end portions of the upper frames 300, so that the collision energy is absorbed by deformation of the bumper beam 310 and the upper frames 300.

Figure 4C:
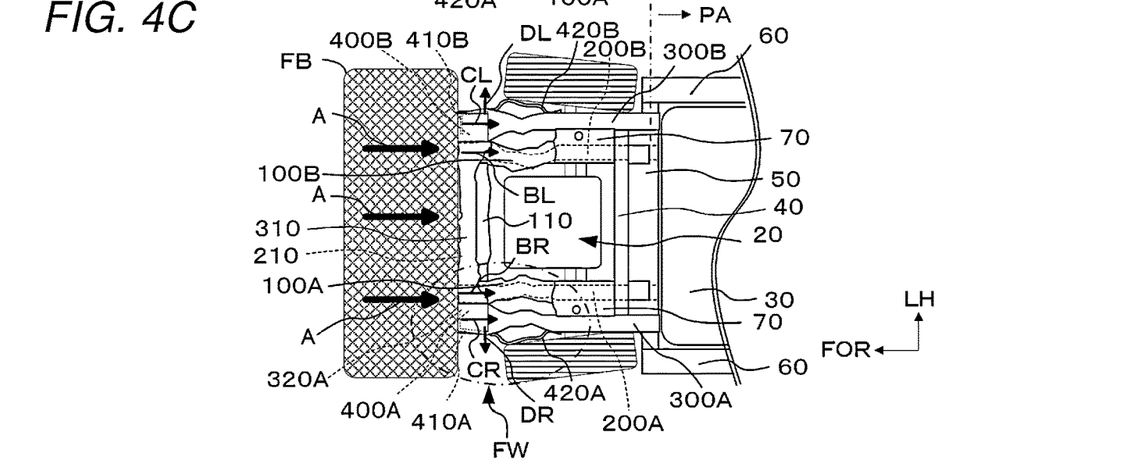

When the collision energy is further increased, as illustrated in FIG. 4C, the collapse and deformation of the front side frames 100, the sub-frames 200, and the upper frames 300 proceeds to positions of the columnar frames 400 by the collision energy transmitted from the direction indicated by arrows B.

The collision energy transmitted from a direction indicated by arrows C (arrows CL, CR) causes the columnar frames 400 to press the front side frames 100 and the sub-frames 200 toward the vehicle rear. An upper edge portion of each of the coupling frames 410 on the vehicle front side is deformed in the direction indicated by arrow C, and an upper edge portion of the coupling frame 410 on an outer side in the vehicle width direction is deformed in a direction indicated by arrow D (arrows DL, DR).

Figure 5:
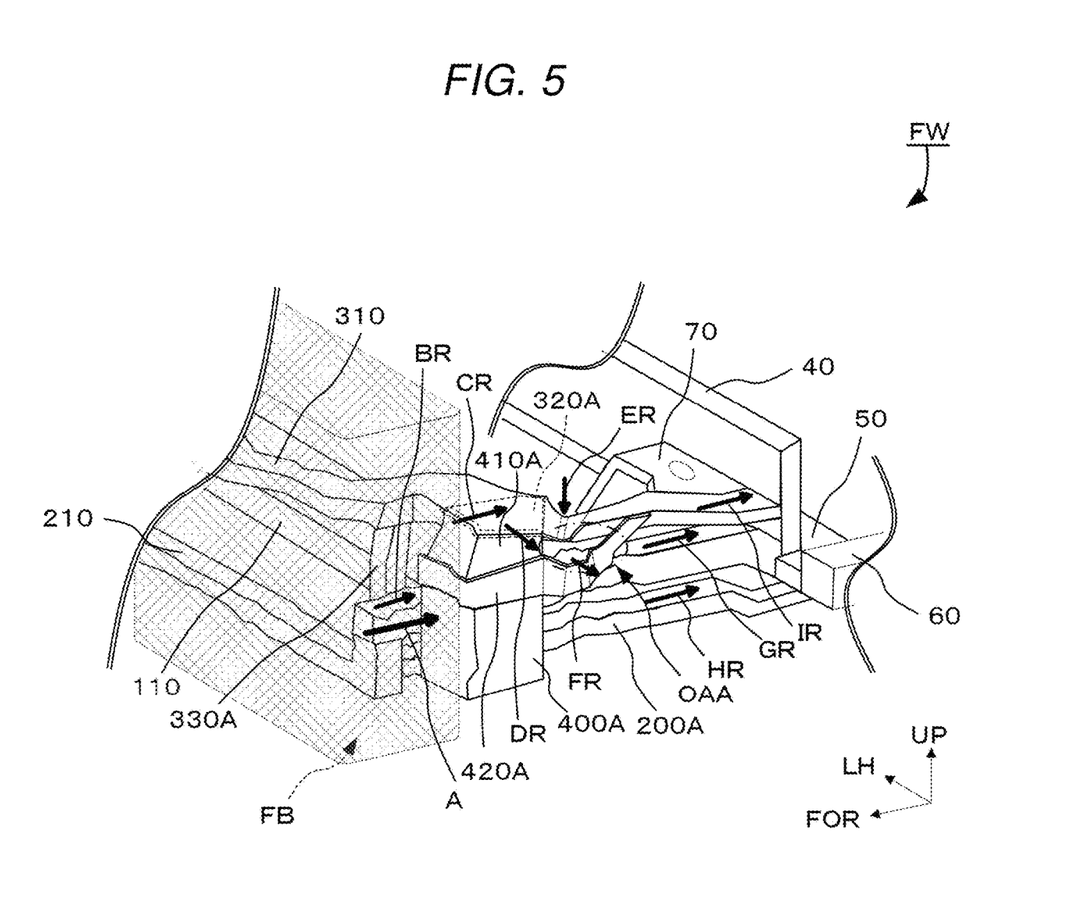
FIG. 5 is a perspective view of area FW illustrated in FIG. 4C, as viewed from above.

As illustrated in FIG. 5, each of the covers 320 covering the upper portion of the coupling frame 410 is pressed by the coupling frame 410 and deformed in a direction indicated by arrow E (arrows EL, ER). The opening OA is formed at the vehicle rear and outer side of each of the coupling frames 410. The opening OA is more fragile than surroundings of the substantially rectangular closed cross-sectional shape, so that when the collision energy is transmitted from the direction indicated by arrow C, the upper frame 300 at the vehicle upper side of the opening OA is deformed in the direction indicated by arrow E. The reinforcement bracket 420 at the vehicle lower side of the opening OA is deformed in a direction indicated by arrow F (arrows FL, FR). The collision energy is absorbed by deformation of the coupling frames 410, the reinforcement brackets 420, and the upper frames 300.

The collision energy transmitted in the front side frames 100 in a direction indicated by arrows G (arrows GL, GR) and the collision energy transmitted in the sub-frames 200 in a direction indicated by arrows H (arrows HL, HR) deform the front side frames 100 and the sub-frames 200 and is dispersed to the torque box 50 and the side sills 60. The collision energy transmitted in the upper frames 300 in a direction indicated by arrows I (arrows IL, IR) deforms the upper frames 300 and is dispersed to the toeboard 40, the torque box 50, the side sills 60, and the strut towers 70.

As described above, the rigid framework of the number-sign shape is formed by coupling the front side frames 100 on both sides in the vehicle width direction, the cross member 110, the sub-frames 200, the sub-cross member 210, the upper frames 300, the bumper beam 310, the torque box 50, the side sills 60, and the strut towers 70 to one another. Consequently, the collision energy is dispersed to the framework of the number-sign shape and absorbed by deformation of the framework of the number-sign shape.

When the input of the collision energy is ended, and when transmission of the collision energy to the front side frames 100, the sub-frames 200, and the upper frames 300 is ended, absorption of the collision energy by deformation of the vehicle body front structure S is ended in consequence.

Case of Small Overlap Collision

Meanwhile, in the case of a small overlap collision, the collision object FB collides with one side of the vehicle V in the vehicle width direction, and collision energy is generated from a direction indicated by arrows SA. Hereinafter, referring to FIG. 6A to FIG. 6C and FIG. 7, a collision with the right side of the vehicle V in a front view will be described.

Figure 6A:
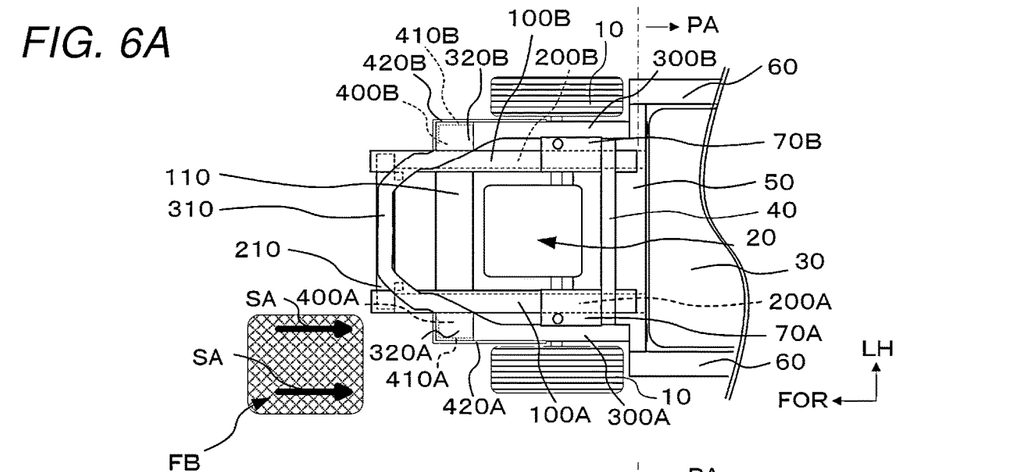
FIG. 6A is a plan view prior to the collision.

When the small overlap collision of the collision object FB with the vehicle V occurs, as illustrated in FIG. 6A, collision energy is generated toward the vehicle V from the direction indicated by arrows SA.

Figure 6B:
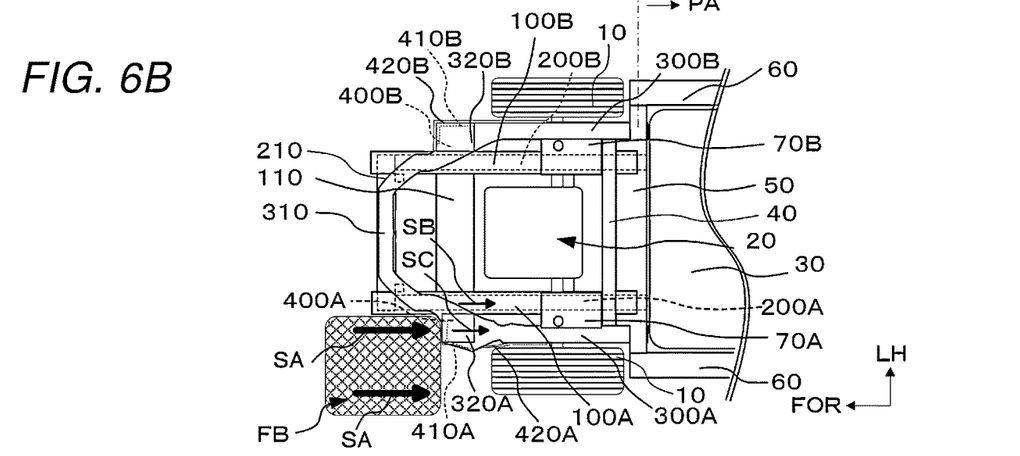
FIG. 6B and FIG. 6C are plan views illustrating the deformation during the frontal collision as time elapses.

As illustrated in FIG. 6B, the collision energy from the front surface of the vehicle V as indicated by arrows SA is transmitted to the front side frame 100A, the sub-frame 200A, and the upper frame 300A via the columnar frame 400A, the coupling frame 410A, and the reinforcement bracket 420A.

The collision energy transmitted from a direction indicated by arrow SC causes the columnar frame 400A to press the front side frame 100A and the sub-frame 200A toward the vehicle rear.

Figure 7:
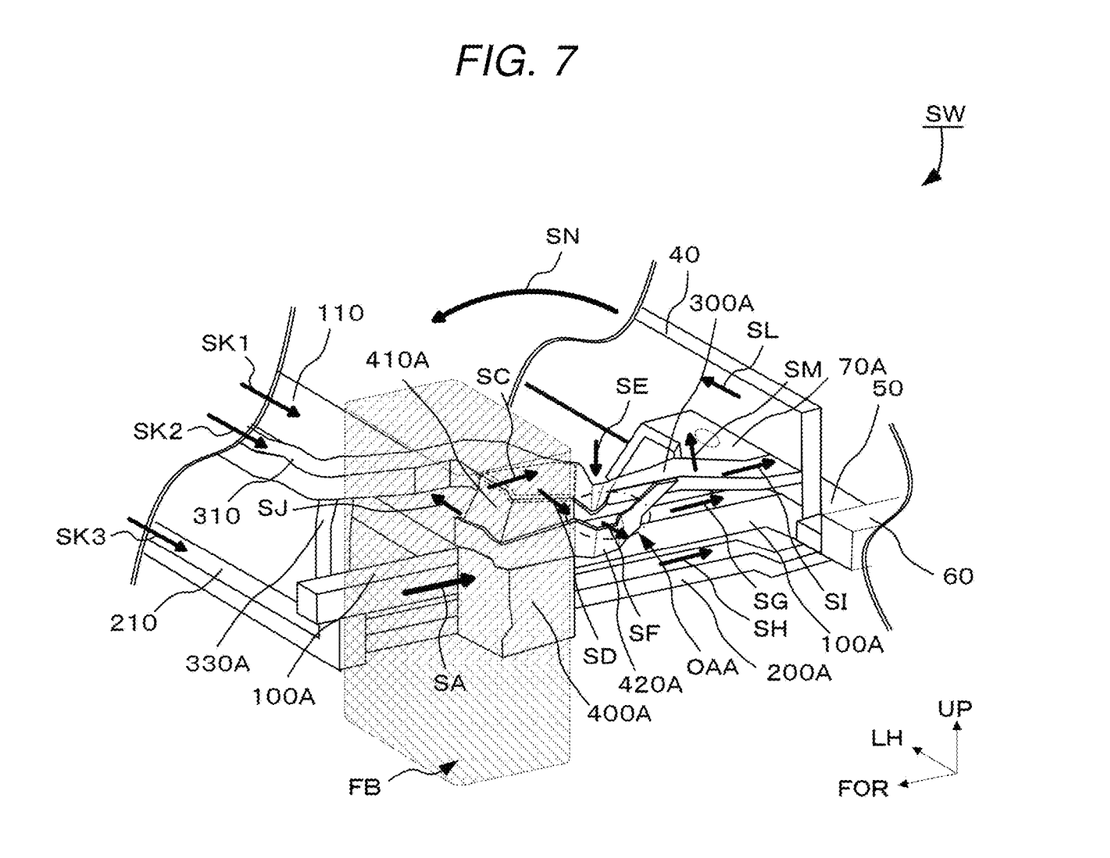
FIG. 7 is a perspective view of area SW illustrated in FIG. 6C, as viewed from above.

As illustrated in FIG. 7, an upper edge portion of the coupling frame 410A on the vehicle front side is deformed toward the vehicle rear, and an upper edge portion of the coupling frame 410A on an outer side in the vehicle width direction is deformed in a direction indicated by arrow SD. The cover 320A covering the upper portion of the coupling frame 410A is pressed by the coupling frame 410A and deformed in a direction indicated by arrow SE. The opening OAA is formed at the vehicle rear and outer side of the coupling frame 410A. The opening OAA is more fragile than surroundings of the substantially rectangular closed cross-sectional shape, so that when the collision energy is transmitted from the direction indicated by arrow SC, the upper frame 300A at the vehicle upper side of the opening OAA is deformed in the direction indicated by arrow SE. The reinforcement bracket 420A at the vehicle lower side of the opening OAA is deformed in a direction indicated by arrow SF. Then, the collision energy is absorbed by deformation of the coupling frame 410A, the reinforcement bracket 420A, and the upper frame 300A.

Figure 6C:
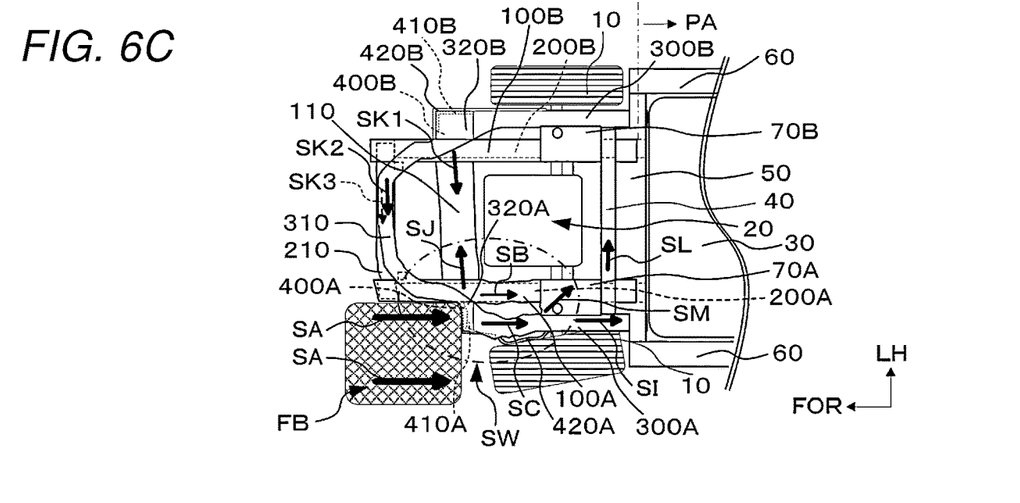

Furthermore, when the collision energy is larger, as illustrated in FIG. 6C, the collapse and deformation of the front side frame 100A, the sub-frame 200A, and the upper frame 300A proceeds to a vehicle rear side of the columnar frame 400A by the collision energy transmitted from the directions indicated by arrow SB and arrow SC.

The collision energy is transmitted to the front side frame 100A in the direction indicated by arrow SB rearward from the vehicle front side. The collision energy is transmitted from the front side frame 100A to the cross member 110 in a direction indicated by arrow SJ. Meanwhile, because deformation of the front side frame 100A proceeds in the direction indicated by arrow SB, the joint between the front side frame 100A and the cross member 110 is displaced toward the vehicle rear. Therefore, on the opposite side to where the collision has occurred, a tensile force in a direction indicated by arrow SK1 is generated at the joint between the front side frame 100B and the cross member 110 and starts deformation of the front side frame 100B. Then, the collision energy is absorbed by the deformation of the front side frame 100B.

The collision energy is transmitted to the sub-frame 200A in the direction indicated by arrow SB rearward from the vehicle front side. Concerning the sub-cross member 210, because deformation of the sub-frame 200A proceeds in the direction indicated by arrow SB, a joint between the sub-frame 200A and the sub-cross member 210 is displaced toward the vehicle rear. Therefore, on the opposite side to where the collision has occurred, a tensile force in a direction indicated by arrow SK3 is generated at a joint between the sub-frame 200B and the sub-cross member 210 and starts deformation of the sub-frame 200B. Then, the collision energy is absorbed by the deformation of the sub-frame 200B.

The collision energy is transmitted to the upper frame 300A in the direction indicated by arrow SB rearward from the vehicle front side. Concerning the bumper beam 310, because deformation of the upper frame 300A proceeds in the direction indicated by arrow SB, a joint between the upper frame 300A and the bumper beam 310 is displaced toward the vehicle rear. Therefore, on the opposite side to where the collision has occurred, a tensile force in a direction indicated by arrow SK2 is generated at a joint between the upper frame 300B and the bumper beam 310 and starts deformation of the upper frame 300B. Then, the collision energy is absorbed by the deformation of the upper frame 300B.

As illustrated in FIG. 7, the collision energy transmitted in the front side frame 100A in a direction indicated by arrow SG and the collision energy transmitted in the sub-frame 200A in a direction indicated by arrow SH deforms the front side frame 100A and the sub-frame 200A and is dispersed to the torque box 50 and the side sill 60. The collision energy transmitted in the upper frame 300A in a direction indicated by arrow SI deforms the upper frame 300A and is dispersed to the toeboard 40 in a direction indicated by arrow SL and to the strut tower 70A in a direction indicated by arrow SM.

Moreover, due to the forces pressing the front side frame 100A, the sub-frame 200A, and the upper frame 300A toward the vehicle rear, the forces pulling the cross member 110, the sub-cross member 210, and the bumper beam 310 inward in the vehicle width direction, and the forces dispersed to the toeboard 40 and the strut tower 70A, a rotating force is generated to press the vehicle body front structure S in a direction indicated by arrow SN about the columnar frame 400A on the side where the collision has occurred.

As described above, because the rigid framework of the number-sign shape is formed in the vehicle body front structure S, the collision energy is dispersed to the framework of the number-sign shape and absorbed by deformation of the framework of the number-sign shape. Moreover, because the vehicle body front structure S is rotated in the direction indicated by arrow SN about the columnar frame 400A on the side where the collision has occurred, the protection area PA is rotated in a direction away from the collision object FB.

When the input of the collision energy is ended, and when transmission of the collision energy to the columnar frame 400A, the coupling frame 410A, and the reinforcement bracket 420A is ended, absorption of the collision energy by deformation of the vehicle body front structure S is ended in consequence.

The vehicle body front structure S according to the above-described embodiment includes: the front side frames 100 disposed in the front part of the vehicle V on both sides in the vehicle width direction, the front side frames 100 extending in the vehicle fore-and-aft direction; the sub-frames 200 disposed at the vehicle lower side of the front side frames 100 on both sides in the vehicle width direction, the sub-frames 200 extending in the vehicle fore-and-aft direction; the upper frames 300 disposed at the vehicle upper side of the front side frames 100 on both sides in the vehicle width direction, the upper frames 300 extending in the vehicle fore-and-aft direction; the cross member 110 extending in the vehicle width direction at the vehicle front side and coupled to the front side frames 100; the columnar frame 400 of a quadrangular prism shape disposed on the outer side of the joint between each of the front side frames 100 and the cross member 110 in the vehicle width direction, the columnar frame 400 extending in the vehicle vertical direction; the coupling frame 410 of the L shape placed on the vehicle upper side of the columnar frame 400, the vehicle front side and the outer side of the coupling frame 410 in the vehicle width direction being coupled to the columnar frame 400; and the reinforcement bracket 420 of the L shape coupled to the vehicle front side and the outer side of the coupling frame 410 in the vehicle width direction, the vehicle rear portion of the reinforcement bracket 420 having the shape projecting upward toward the vehicle rear. The columnar frame 400 couples each of the front side frames 100 and each of the sub-frames 200 to each other in the vehicle vertical direction. The coupling frame 410 couples the columnar frame 400 and each of the upper frames 300 to each other in the vehicle vertical direction. The reinforcement bracket 420 couples the coupling frame 410 and the vehicle rear side of each of the upper frames 300 to each other.

In the case of a full wrap frontal collision of the vehicle V, the vehicle body front structure S transmits collision energy generated by the frontal collision to the upper frames 300 via the front side frames 100, the sub-frames 200, and the bumper beam 310 so as to deform the front side frames 100, the sub-frames 200, the sub-cross member 210, the upper frames 300, and the bumper beam 310. When the collision energy is increased, the collision energy is further transmitted to the front side frames 100, the sub-frames 200, and the upper frames 300 via the columnar frames 400, the coupling frames 410, and the reinforcement brackets 420. The columnar frames 400 press and deform the front side frames 100 and the sub-frames 200 toward the vehicle rear. The upper edge portion of each of the coupling frames 410 on the vehicle front side is deformed toward the vehicle rear, and deforms the upper frame 300 via the cover 320 covering the upper portion of the coupling frame 410 and via the reinforcement bracket 420. In the case of a small overlap collision, the vehicle body front structure S transmits the collision energy to the front side frame 100, the sub-frame 200, and the upper frame 300 via the columnar frame 400, the coupling frame 410, and the reinforcement bracket 420. Then, the vehicle body front structure S disperses the collision energy to the rigid framework of the number-sign shape and deforms the framework of the number-sign shape, which is formed by coupling the front side frames 100 on both sides in the vehicle width direction, the cross member 110, the sub-frames 200, the sub-cross member 210, the upper frames 300, the bumper beam 310, the torque box 50, the side sills 60, and the strut towers 70 to one another. Moreover, due to the forces pressing the front side frame 100, the sub-frame 200, and the upper frame 300 toward the vehicle rear, the forces pulling the cross member 110, the sub-cross member 210, and the bumper beam 310 inward in the vehicle width direction, and the forces dispersed to the toeboard 40 and the strut tower 70, the rotating force is generated to press the vehicle body front structure S in the direction indicated by arrow SN about the columnar frame 400 on the side where the collision has occurred.

That is, the vehicle body front structure S can absorb the collision energy by dispersing the collision energy to the rigid framework of the number-sign shape via the columnar frames 400, the coupling frames 410, and the reinforcement brackets 420, and by deforming the framework of the number-sign shape. Therefore, the collision energy can be absorbed inside the vehicle front compartment FA. In the case of the small overlap collision, by the forces pressing the front side frame 100, the sub-frame 200, and the upper frame 300 toward the vehicle rear, the forces pulling the cross member 110, the sub-cross member 210, and the bumper beam 310 inward in the vehicle width direction, and the forces dispersed to the toeboard 40 and the strut tower 70, the vehicle body front structure S can be rotated about the columnar frame 400 in the direction to displace the protection area PA away from the collision object FB.

This can prevent deformation of the cabin CA and the battery pack 30 existing in the protection area PA.

In the vehicle body front structure S according to the embodiment, the opening OA surrounded by the reinforcement bracket 420, the coupling frame 410, and each of the upper frames 300 is formed at the outer side of the vehicle body front structure S in the vehicle width direction.

When the collision from the vehicle front occurs, the collision energy deforms the upper edge portion of each of the coupling frames 410 on the vehicle front side toward the vehicle rear, and deforms the upper edge portion of the coupling frame 410 on the outer side in the vehicle width direction outward in the vehicle width direction. The cover 320 covering the upper portion of the coupling frame 410 is pressed by the coupling frame 410 and deformed in the direction indicated by arrow E. The opening OA is more fragile than surroundings of the substantially rectangular closed cross-sectional shape, so that the upper frame 300 at the vehicle upper side of the opening OA is deformed toward the vehicle lower side by the collision energy. The reinforcement bracket 420 at the vehicle lower side of the opening OA is deformed outward in the vehicle width direction by the collision energy. The collision energy is absorbed by deformation of the coupling frames 410, the reinforcement brackets 420, and the upper frames 300.

That is, because the openings OA more fragile than surroundings of the substantially rectangular closed cross-sectional shape are formed in the vehicle body front structure S, the coupling frames 410, the reinforcement brackets 420, the upper frames 300, and the covers 320 can be deformed to absorb the collision energy. Therefore, the collision energy can be absorbed inside the vehicle front compartment FA.

This can prevent deformation of the cabin CA and the battery pack 30 existing in the protection area PA.

Although the embodiment of the disclosure has been described in detail heretofore with reference to the drawings, configuration examples are not to be limited to the embodiment but may include designs, for example, within the scope of the subject matter of the disclosure.

According to the one or more embodiments of the disclosure, deformation of the cabin and the battery pack can be prevented even in the multiple frontal collision modes.

The invention claimed is:

1. A vehicle body front structure for a vehicle, the vehicle body front structure comprising:
  front side frames disposed in a front of the vehicle on both sides of the vehicle in a vehicle width direction of the vehicle, the front side frames extending in a vehicle fore-and-aft direction of the vehicle;

sub-frames disposed below of the front side frames on the both sides in the vehicle width direction respectively, the sub-frames extending in the vehicle fore-and-aft direction;

upper frames disposed above the front side frames on the both sides in the vehicle width direction respectively, the upper frames extending in the vehicle fore-and-aft direction;

a cross member extending in the vehicle width direction in the front of the vehicle and coupled to the front side frames;

columnar frames each of which is disposed outward of a joint between a corresponding one of the front side frames and the cross member in the vehicle width direction, the columnar frames extending in a vehicle vertical direction of the vehicle;

coupling frames each of which is disposed on a corresponding one of the columnar frames, each of the coupling frames having a front portion in the fore-and-aft direction and an outer portion in the vehicle width direction that are coupled to the corresponding one of the columnar frames; and reinforcement brackets each of which is coupled to the front portion and the outer portion of a corresponding one of the coupling frames in the vehicle width direction, each of the reinforcement brackets comprising a rear portion in the fore-and-aft direction that is shaped so as to project upward toward a rear of the vehicle, wherein each of the columnar frame couples the corresponding one of the front side frames and a corresponding one of the sub-frames in the vehicle vertical direction, each of the coupling frames couples the corresponding one of the columnar frames and a corresponding one of the upper frames in the vehicle vertical direction, and each of the reinforcement brackets couples the corresponding one of the coupling frames and a rear portion of a corresponding one of the upper frames in the fore-and-aft direction.

2. The vehicle body front structure according to claim 1, wherein openings each of which is surrounded by a corresponding one of the reinforcement brackets, a corresponding one of the coupling frames, and a corresponding one of the upper frames are provided outward of the corresponding one of the coupling frames in the vehicle width direction.

* * * * *